Dec. 9, 1952  J. R. SPALDING  2,621,232
APPARATUS FOR MEASURING MOISTURE
Filed Feb. 8, 1951  5 Sheets-Sheet 1
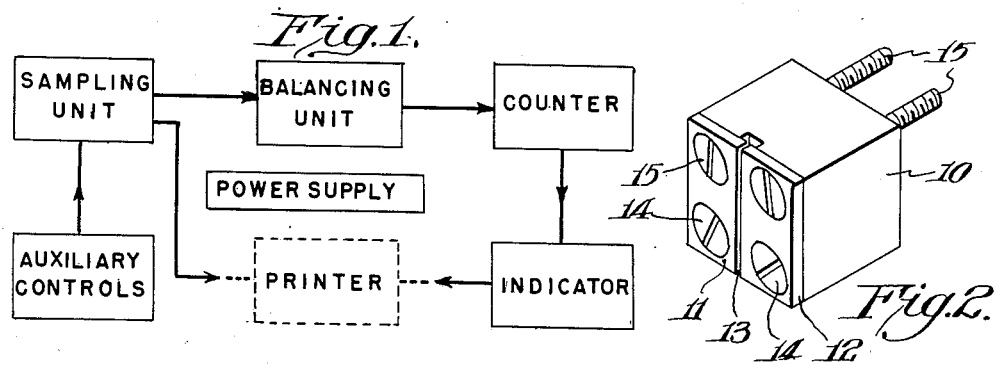
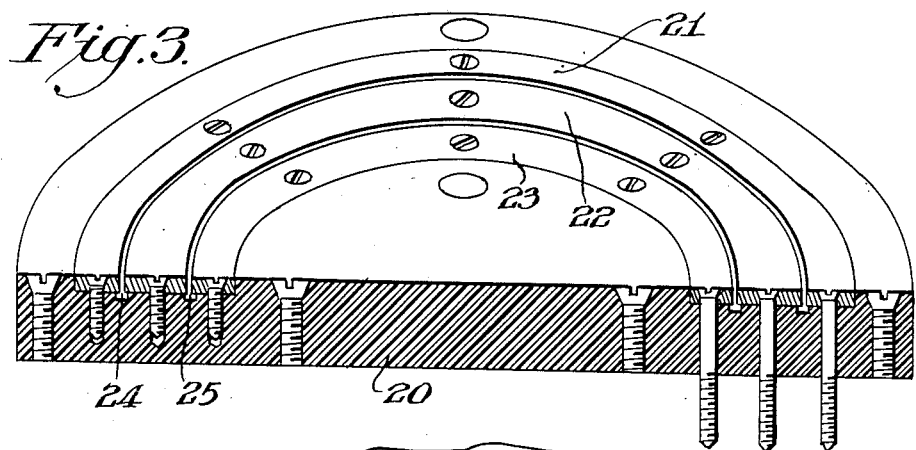
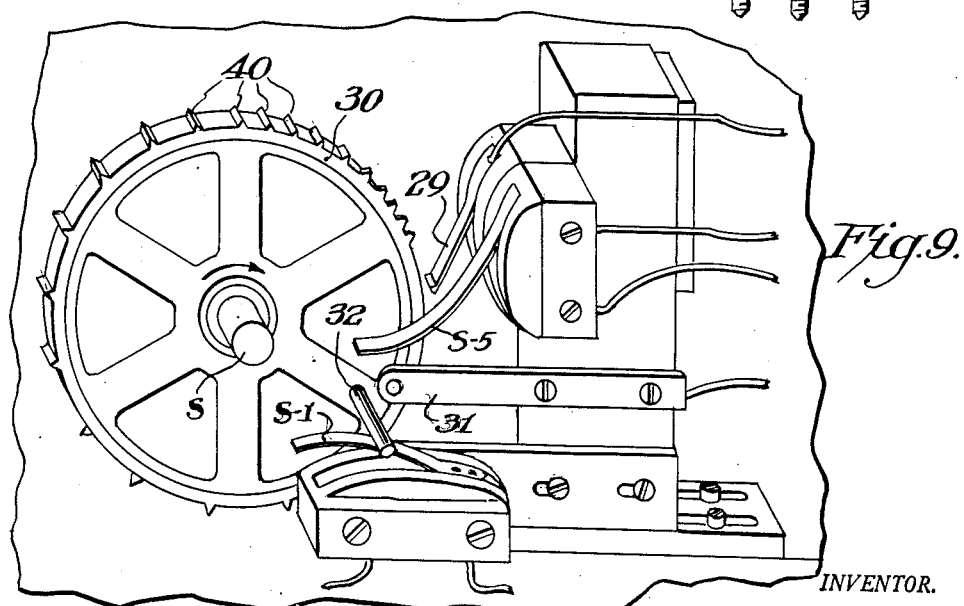
INVENTOR.
JOHN ROBERT SPALDING
BY
Norris E. Ruckman
ATTORNEY.

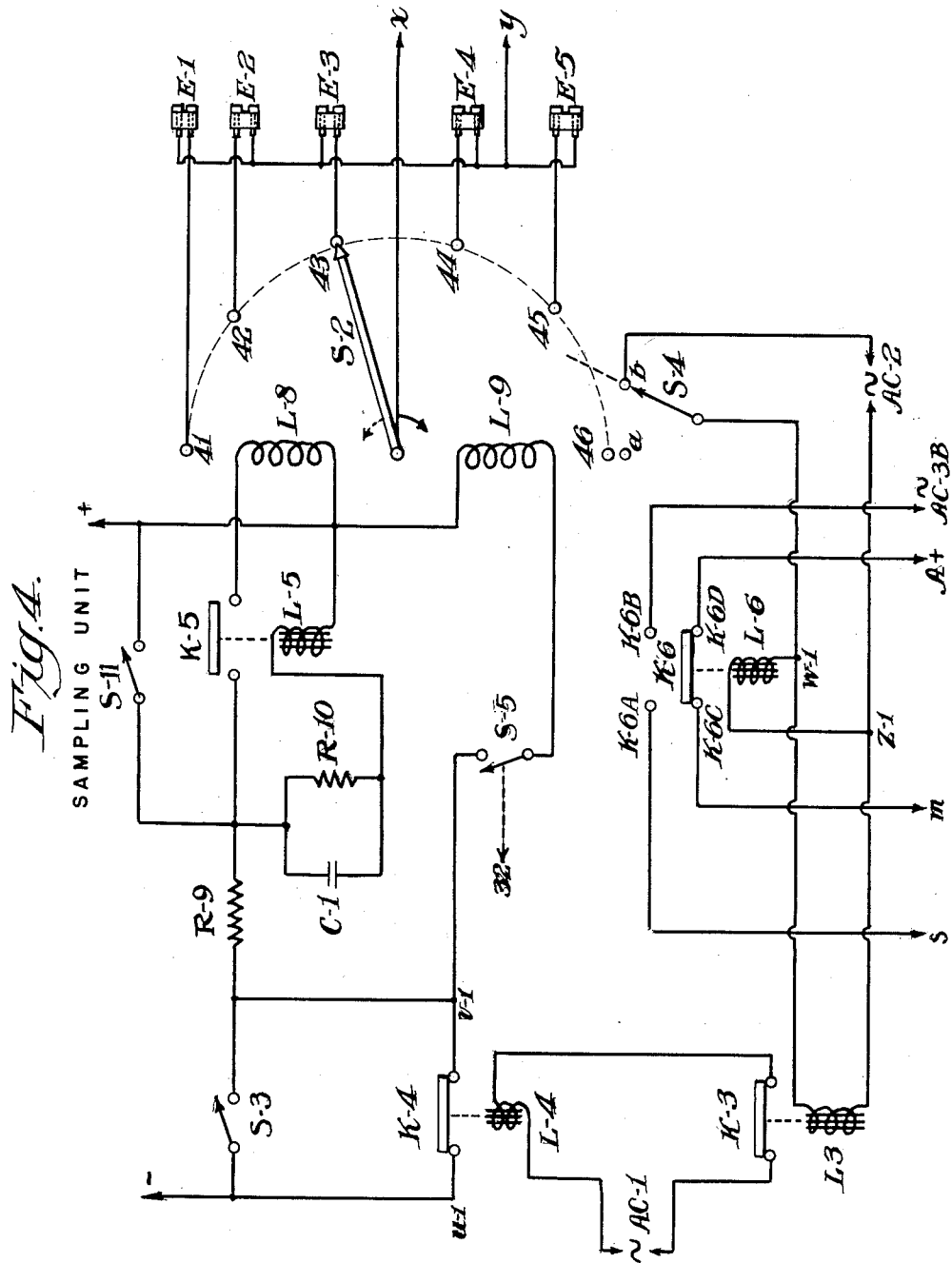

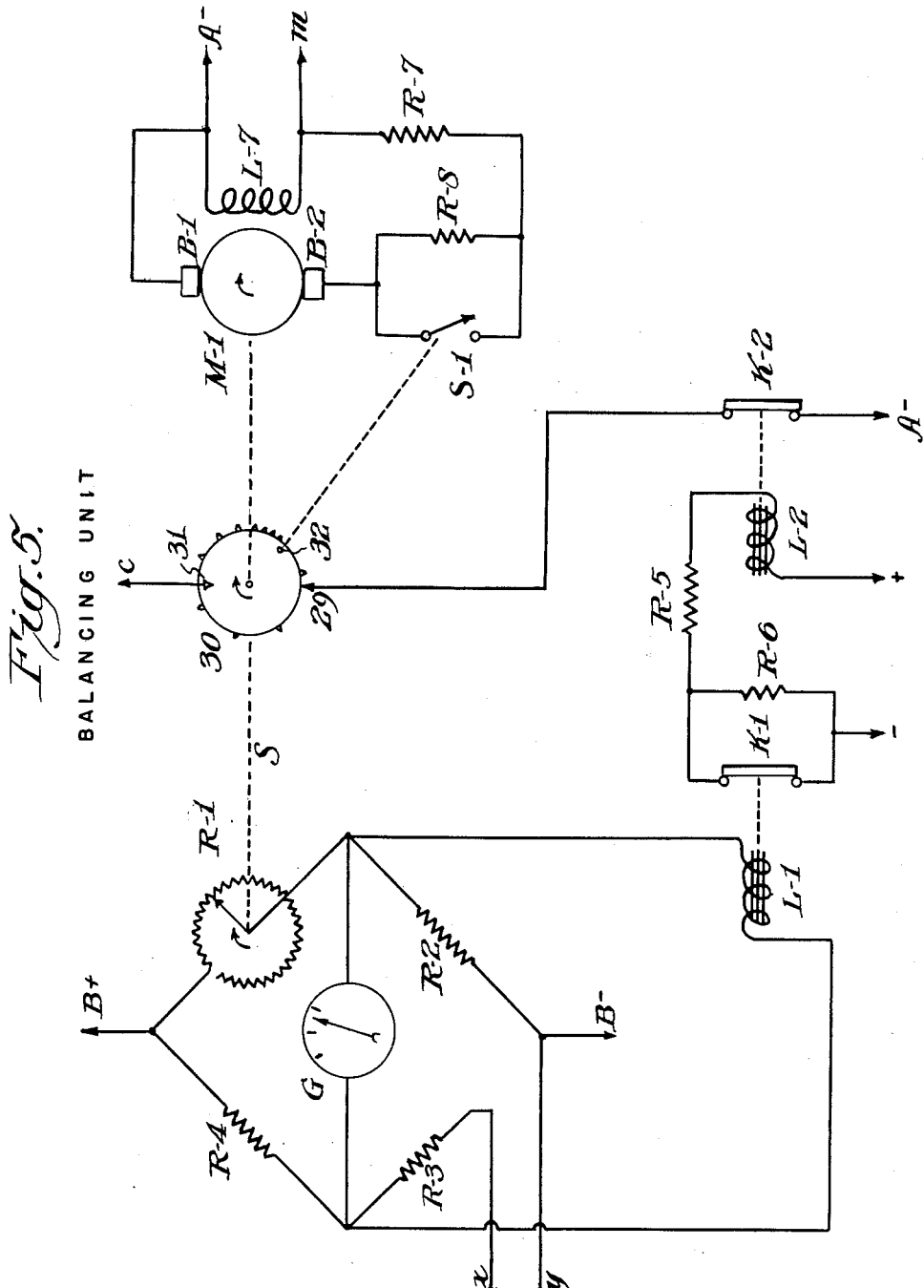

Dec. 9, 1952      J. R. SPALDING      2,621,232
APPARATUS FOR MEASURING MOISTURE
Filed Feb. 8, 1951      5 Sheets-Sheet 4

INVENTOR.
JOHN ROBERT SPALDING
BY
*Norris E. Rushman*
ATTORNEY.

Dec. 9, 1952

J. R. SPALDING 2,621,232

APPARATUS FOR MEASURING MOISTURE

Filed Feb. 8, 1951

5 Sheets-Sheet 5

Fig. 8
AUXILIARY CONTROLS

INVENTOR.
JOHN ROBERT SPALDING
BY
ATTORNEY.

Patented Dec. 9, 1952

2,621,232

UNITED STATES PATENT OFFICE 2,621,232

APPARATUS FOR MEASURING MOISTURE

John Robert Spalding, Kenmore, N. Y., assignor to E. I. du Pont de Nemours and Company, Wilmington, Del., a corporation of Delaware Application February 8, 1951, Serial No. 210,053

6 Claims. (Cl. 175—183)

This invention relates to apparatus for measuring moisture variations in otherwise uniform lots or shipping units of material, such as baled staple fiber and beamed yarn, and is more particularly concerned with electrical apparatus which will automatically measure moisture in such material at successive locations and furnish an average of the measurements.

Cellulose and some of the synthetic fiber-forming materials are subject to rapid and widespread fluctuations in moisture content. Products made wholly or partly of cellulose invariably contain an appreciable quantity of moisture, and it is essential that the customer not be billed for the water contained in the product. In the fiber manufacturing industry it has been the practice to remove sample portions from the finished product for moisture measurement. This may be done in any of several ways, but invariably it presents problems of the representativeness of the sample, partial destruction of the product, and appreciable time lag between the sampling and the actual testing.

It is an object of the present invention to provide an apparatus for automatically making rapid, accurate determination of moisture in otherwise substantially uniform lots or shipping units of material, and which will be especially well adapted for use with a staple fiber baler or yarn beamer, without harming the material and without requiring skilled analysts. Other objects of the invention will become apparent from the following description, the drawings and appended claims.

The above objects are accomplished by an apparatus which applies a multiplicity of electrode sets (units) to different portions of the material in which the moisture content is to be determined, applies a measuring potential through the material at each electrode unit in turn, measures the resulting potential drops by successively comparing the potential drop at each electrode unit with a series of known potential drops, converts each individual measurement into moisture values and averages the results. The operation of the apparatus is arranged to be completely automatic from the time the operator initiates contact of the electrodes with the material tested. In general, the apparatus is useful for measuring moisture in any material for which moisture is the only variable having any significant effect on the conductivity.

In the drawings, which illustrate preferred embodiments of the invention,

Figure 1 is a block diagram of the apparatus, intended to give a general idea of the several components and their interrelation, Figure 2 is a perspective view of one form of sampling electrode, Figure 3 is a perspective view of a half-section of another form of sampling electrode, Figure 4 is a circuit diagram of one form of sampling unit for successively connecting the electrodes, Figure 5 is a circuit diagram of one form of the balancing unit for determining the electrode resistance values, Figure 6 is a circuit diagram of one form of counter and indicator for evaluating the balancing unit determinations and providing a moisture indication, Figure 7 is a circuit diagram of a printer for providing a printed record of the moisture determination, Figure 8 is a circuit diagram of auxiliary controls used in one application of the apparatus, and Figure 9 is a perspective view of an impulse wheel used to transmit the balancing unit determinations to the counter.

Five essential components of the apparatus are indicated in Fig. 1 by solid blocks. The block labelled "Power Supply" represents a conventional unit for supplying electrical energy to the other components at various direct or alternating potentials as required. Unnecessary complication of this diagram is avoided in indicating the dependence of the other components on the power supply by grouping them around the power supply rather than by connecting them to it with lines.

The "Sampling Unit" successively connects the apparatus with each set of electrodes used, these being located at sample points in different portions of the material to be tested. The "Balancing Unit" is the heart of the measurement activity and comprises a Wheatstone bridge provided with a scanning potentiometer and relays for automatically comparing the potential drop across each electrode in turn with a series of varying potentials, corresponding to increasing moisture values, and transmitting these values by means of electrical impulses until the electrode potential is balanced. The "Counter" combines the electrical impulses from all of the individual measurements to obtain an arithmetic mean value of the moisture in the material at the sampling points, and the "Indicator" delivers the combined result in an intelligible form.

Either or both of the two other components indicated may be useful in many applications. The "Printer" may be employed to give a printed record of the moisture determinations. For example, it may be desirable for the moisture value to be printed automatically on an identifying tag or ticket to accompany the material tested. "Auxiliary Controls" may be used to adapt the apparatus to production operations, so that safe and convenient coordination of the production and measurement operations is provided.

The sampling electrodes may assume a variety of forms, depending upon the application. A simple type, shown in Fig. 2, consists merely of a non-conducting backing piece 10 supporting two parallel rectangular electrical conductors 11, 12 separated by an air gap 13 across which the material to be measured may be placed. The conductors are secured to the backing piece by bolts 14, 15. The bolts 15 extend beyond the back to provide means for attaching electrical leads. This type is used upon yarns or filaments wound up on beams or similar devices, each electrode pair being oriented with the gap perpendicular to the strands of material.

Used with staple fiber, the multiple electrode shown in Figure 3 has proved satisfactory. It consists of a non-conducting backing 20, circular in form, which is recessed to support three concentric circular conductors 21, 22, 23. The outer 21 and inner 23 conductors are connected together, so the two high-resistance gaps 24, 25 between the rings are effectively in parallel. One electrode pair or multiple electrode, such as shown in Fig. 2 or 3, is required for each sampling position. An array of five electrode units located so that representative portions of the material are sampled, provides a desirable compromise between the brief measurement time required by one and the opposing goal of extreme accuracy afforded by using a multitude. An average of the moisture determinations made with five electrodes has been found to provide adequate precision of measurement for most applications.

The circuit diagram of the sampling unit shown in Fig. 4 shows the connections for the various electrode units and the mechanism for switching from one to another. The actuating impulses for the switching originate elsewhere, as is briefly indicated in the diagram and as will be explained more fully in discussion of the next component. The stepping relay S-2 successively connects all the electrode pairs to the balancing unit, which is shown in Figure 5. The heart of the balancing unit is a Wheatstone bridge, in one arm of which is connected the electrode unit whose gap resistance is to be evaluated. Reading clockwise from the top, the four arms of the bridge contain resistances R-1, R-2, R-3 and R-4 respectively. The electrode resistance is connected in the same arm and in series with resistance R-3. A balance meter G is connected across the bridge in a horizontal direction and voltage is applied across the bridge in a vertical direction, as shown.

Resistance R-1 is a potentiometer of circular form with a motor-driven arm. While each electrode unit is connected to the bridge, the motor M-1 rotates the potentiometer arm, continuously varying the resistance. Sooner or later, the potential drop across the bridge balance meter G falls to zero and reverses direction, operating associated relays to be described. This concludes the individual measurement by releasing the counter, although the motor continues to vary the value of the adjustable resistor or potentiometer throughout its entire range.

Also connected to the potentiometer scanning motor M-1 is an impulse wheel 30, which transmits pulses to the counter until the measurement end point is reached. Details of this impulse wheel will be discussed subsequently in connection with Fig. 9. Either electrical or mechanical counting systems may be used, and Figure 6 depicts a combined electromechanical unit that has proved satisfactory. Counting pulses from the impulse wheel arriving at the counter pass through the relays shown there and actuate an indicator comprising an escapement 33, escapement gear 34 and indicator dials 35, 36, 37. Details of the indicator mechanism are not shown; it being the usual gear-connected decimal arrangement. Three dials are used, representing tens, units, and tenths of moisture per cent. If desired, some other source of visual indication, such as a dial and pointer, or even an audible indication may be employed. Figure 7 contains the circuit diagram of a device for printing the dial moisture reading onto an identifying tag or ticket that may then accompany the material whose moisture has been measured.

It is simplest to consider operation of the apparatus at the beginning of one of the intermediate readings, rather than at the first or last. Assume that the contactor of stepping switch S-2 (Figure 4) is at terminal 43, connecting a lead to one side of an electrode unit E-3 to the bridge in the balancing unit (Figure 5) through lead $x$. All of the electrode units have a common lead $y$ to the lower or B— corner of the bridge. The resistance of one arm of the bridge is thus made up of the unknown resistance across the electrode gap in series with resistor R-3. The resistance of the opposite arm of the bridge is that portion of resistor R-1 tapped off by the potentiometer arm, which is rotated by scan motor M-1. The circuit to M-1 is completed through power supply lead A+ (Figure 4), relay contactor K-6 across contacts K-6C and K-6D, lead $m$, the motor connections (Figure 5), and power supply lead A—. Contactor K-6 is in this position as long as "stop print" switch S-4 is at position $b$, completing the circuit for relay coil L-6 from alternating current power supply AC-2.

Rotation of scan motor M-1 turns the potentiometer wiper arm, connecting more and more resistance from R-1 into the bridge circuit. A fixed potential is continuously applied at opposite corners of the bridge as shown by power supply leads B+ and B—, which connect to the respective junctions of R-1 with R-4 and of R-2 with the unknown resistance. As the effective value of R-1 increases, the potential drop in adjacent resistor R-2 decreases. Eventually a value of R-1 is reached such that R-1 forms the same fraction of the sum of R-1 and R-2 as R-4 does of the sum of R-3, R-4, and the unknown resistance between the electrodes. This is known as the balance or end point of the measurement.

At balance, there is no current through bridge balance meter G, which is connected from the junction of R-1 with R-2 to the junction of R-3 with R-4, because the potentials on both sides of it are equal. The bridge balance meter is in parallel with galvanometer relay coil L-1, and current through L-1 holds contactor K-1 closed so long as R-1 is too small to balance the unknown resistance. The condition of balance exists only momentarily; the effective value of R-1 continues to increase, unbalancing the bridge in the opposite direction from its previous unbalance. This reversal of potential changes the direction of current through L-1, operating the relay and breaking the circuit through K-1 to the second relay coil L-2, which is in series with a protective resistance R-5. An additional resistance R-6 is present across contactor K-1 of the first relay to prevent sparking at the contacts by providing a path to relieve the transient potential difference created by the diminution of current through inductance L-2. Lack of current to L-2 permits contactor K-2 to open, interrupting the flow of pulses from the balancing unit to the counter. So long as K-2 is closed a circuit is complete from power supply lead A— through K-2, the conjunction of contact 29 and one of the cogs on impulse wheel 30, the wheel itself, wiper arm 31 in contact with the wheel, lead c, inductance L-10 (Figure 6), and power supply lead A+.

Scan motor M-1 rotates impulse wheel 30 just as it does the arm of potentiometer R-1. The spacing of the cogs about the periphery of the impulse wheel is approximately logarithmic, and is arrived at empirically to represent equal incremental moisture equivalents. The operation of the counter is explained in detail below; its function is to effect transmission of a pulse through lead c to advance the indicator tenths dial one notch, which represents the addition of one-tenth percent to the moisture average. Each time a cog of the wheel makes contact with 29, another one-tenth percent is added so long as K-2 is closed. The close spacing of the cogs at low resistance values of R-1 necessitates a slower speed of motor M-1 over this region in order not to exceed the counter recovery time. This ensures that each pulse will be properly counted. The motor is slowed by the action of pin 32 on the impulse wheel in conjunction with slowing switch S-1. While S-1 is closed, armature current for M-1 flows through resistor R-7 and between brushes B-1 and B-2. The periodic opening of S-1 by pin 32 decreases the armature current by inserting resistance R-8 into the circuit.

Upon the arrival of a counting impulse at the high impedance input relay coil L-10 (Figure 6), contactor K-7 closes, furnishing C— potential to contacts K-8B and K-9B of the lockout relay and to contacts K-10A and K-11A of the contact relay. Closed contactor K-8 of the lockout relay furnishes C— to one side of contact relay coil L-12; the opposite (common to K-10B) side of L-12 is connected to one side of lockout relay coil L-11, thence through L-11 to C+. Capacitor C-2 prevents sparking at K-7 and its contacts before the circuit is firmly closed, as current builds up rapidly in L-11 and L-12.

Upon actuation of the counter contact relay, contactor K-12 closes first, furnishing C— to count relay coil L-13; the free end of L-13 leads directly to C+. (The gaps of the contact relay have different amounts of clearance so that contactors K-10 and K-11 are not closed immediately.) Count relay contactor K-13 closes, depressing the arm of escapement 33, as well as supplying C— through K-13 to contact K-11B of the contact relay. Contactor K-11 of the contact relay closes next, furnishing C— from closed K-13 to contacts K-8B and K-9B of the lockout relay and to contact K-10A of the contact relay, relieving the dependence of these points upon the supply path through contactor K-7 of the high impedance input relay, which opens upon cessation of the brief pulse in L-10. Contactor K-10 of the contact relay closes as contactor K-8 of the lockout relay opens, maintaining C— to lockout relay coil L-11 but reversing the polarity of contact relay coil L-12 by furnishing C— directly to K-10B, instead of bringing it through K-8. Contactor K-9 of the lockout relay closes, supplying C— directly to L-11, relieving its dependence upon the path through contactor K-10, but not disturbing its dependence upon the rest of the path through contactors K-11 and K-13.

As the contact relay begins to open because of the reversed polarity of L-12, contactor K-10 opens first (not affecting the lockout coil, which is now supplied through closed contactor K-9). Contactor K-11 opens next, interrupting the C— supply to lockout relay coil L-11. The lockout relay releases, opening contactor K-8 and closing contactor K-8. Contactor K-13 of the contact relay opens last, interrupting the C— path to the count relay coil L-13. Capacitor C-3 between contacts K-12A and K-12B acts with resistor R-10 across L-13 to absorb the resulting transient potential difference, preventing sparking between K-12 and its contacts. The count relay releases K-13, cutting off C— from L-12, which has resistor R-9 across it to prevent sparking at the contacts. This allows the arm of escapement 33 to retract to its former position, finally turning tenths dial 35 one-tenth by completing the rotation of gear 34 one notch. The counter is now ready to receive another input pulse from the impulse wheel. This rather complicated series of relays provides positive action of the indicator by each input pulse.

Tenths dial 35 of the indicator is directly connected to gear 34, which is operated by escapement 33. Units dial 36 and tens dial 37 of the indicator are connected to the tenths dial by appropriate gearing (not shown). Since five measuring stations are used, the apparatus is arranged to advance dial 35 one-tenth percent for each measured one-half (i. e., 5 times $\frac{1}{10}$) per cent moisture during an individual reading. After all five readings are complete, the dials of the indicator then read the true average of the five individual measurements. Thus, instead of adding the individual moistures and dividing by five, the device obtains the same result by merely adding one-fifth of each one.

As previously mentioned, when contactor K-2 opens at balance, interrupting the path to the counter, the individual measurement is complete. Scan motor M-1 continues to drive potentiometer R-1 and impulse wheel 30 throughout 360°. Upon completion of this cycle, pin 32 on wheel 30 momentarily depresses switch S-5 (Figure 4), which completes the circuit of stepping coil L-9 through closed contactor K-4. This furnishes a stepping pulse of current through inductance L-9, moving the contactor of stepping switch S-2 to the next numbered position. Assuming the preceding measurement was taken through terminal 43, the fourth electrode unit E-4, would be connected to the bridge next through contact 44 by switch S-2. The measuring cycle described above then repeats itself. Upon receipt of another stepping pulse, the contactor of switch S-2 advances to terminal 45 for another measurement. The fifth measurement is the last in each series, so as S-2 goes from 45 to 46 an entirely different course of events follows.

As the contactor of S-2 passes between terminals 45 and 46, the arm of S-4 is moved from b to a. This switching of S-4 removes the holding potential from contactor K-3, releasing it. The resulting interruption of current through L-4 releases contactor K-4, breaking the path for the stepping potential. As S-4 leaves position b, it also interrupts the current to coil L-6, releasing contactor K-6. The scan motor stops rotating as the path from contact K-6C to K-6D is broken. If the apparatus is used to furnish a visual indication, the operator then notes the result given by the indicator dials and resets the dials to zero ready for the next measurement. However, if a printed result is desired, contactor K-6 may be arranged to connect two other contacts K-6A and K-6B for the purpose of furnishing a recording impulse to a printer.

Figure 7 is the printer circuit diagram. Switch S-6 must be closed before the printer will operate, since S-6 is present in one side of the A.-C. line that supplies the print motor and the coils of the three relays. (Where necessary, opposite sides of the alternating current lines are designated by A or B following the numeral that identifies the line itself.) AC-3B is already present at contact K-17B of the print hold relay and at contact K-16B of the print motor stop relay. The release of K-6 (Figure 4) provides AC-3B through lead s to contact K-14B of the print motor start relay. Contactor K-14 provides a path directly to print motor M-2 through contact K-14A. As AC-3A is already present at the opposite side of the motor, it begins to rotate. A lead supplies contact K-15B and coil L-17 from K-14A. Passage of current through L-17 causes contactor K-17 to close, furnishing AC-3B directly to the print motor, relieving its dependence upon the path through K-6. Rotation of the print motor forces a printing hammer (not shown) against the bottom of a piece of paper upon which the measurement is to be recorded. The paper is forced against an inked ribbon in contact with the indicator dials; this stamps the dial reading upon the paper.

Continued rotation of the print motor closes stop switch S-7, supplying AC-3B to contact K-15A and to print motor stop relay coil L-15. Current through L-15 causes K-15 and K-16 to close. The closing of K-15 furnishes a direct path for AC-3B from K-15A to the print motor, relieving dependence of the print hold relay coil L-17 upon flow through print motor start relay contacts K-14A and K-14B. The closing of K-16 furnishes a direct path for AC-3B present at contact K-16B to print motor start relay coil L-14 at contact K-14C. The print motor start relay operates, breaking the path between K-14A and K-14B by moving contactor K-14 to join K-14C and K-14B. This furnishes a direct path for AC-3B to L-14 through K-14 and K-17. Rotation of the print motor finally opens stop switch S-7, breaking the AC-3B path to print hold relay coil L-17 and to print motor M-2 (through K-15) and to L-15. This stops M-2 and releases K-17. Upon the opening of S-7, there being no other complete path to L-15, the print motor stop relay opens, releasing K-15 and K-16. The release of K-16 discontinues AC-3B to L-14, releasing the print motor start relay. The unit is now ready to receive another printing impulse. The printer may be arranged to actuate mechanism for resetting the indicator or this may be accomplished manually.

Although the starting mechanism of this entire apparatus has been represented in the form of two simple relays, K-3 and K-4 (Figure 4) being their contactors, a more complex system is sometimes useful, especially where heavy mechanism is used for the baling of staple fiber. Figure 8 represents the auxiliary controls required for operation of the baler. Proper connections to the sampling unit for the use of these controls in place of the two simple relays may be made by deleting the lower left-hand portion of Figure 4 (that is, everything falling between $u-1$, $v-1$, $w-1$, and $z-1$), replacing it with Figure 8 by superimposing $u-2$ upon $u-1$, $v-2$ upon $v-1$, $w-2$ upon $w-1$, and $z-2$ upon $z-1$.

The operator may start the apparatus by depressing either down button K-20 or K-21, furnishing AC-1A through closed down limit switch S-9 and contacts K-27A and K-27B bridged by contactor K-27 to down relay coil L-18; the other side of L-18 receives AC-1B through closed protective interlocks shown lumped together as S-8, closed contactor K-24 of the baler lockout relay, closed stop button K-23, and through the closed down button itself. (If down button K-20 is pressed, instead of K-21, the AC-1B path lies through closed stop button K-22, as well.) Flow of current through L-18 closes contactor K-25 and actuates a down switch in the baler motor circuit (not shown), which starts the baler head moving downward. The closing of K-25 furnishes AC-1B to coil L-18 by the path stated above except that the down buttons need not be considered, contactor K-29 across contacts K-29A and K-29B providing an alternative path; the depressed down button may then be released.

Motion of the baler head downward soon closes up limit switch S-10, furnishing AC-1A to coils L-20, L-21, and L-22; there is no AC-1B present at the other sides of these coils at the moment. Continued operation of the baler lowers the baler head, upon which the moisture measuring electrodes are mounted, until it contacts and compresses the staple fiber sufficiently to increase the baler motor current to the point where it operates the baler overload relay. Coil L-23 is energized by this overload, removing contactor K-29 from contacts K-29A and K-29B. This interrupts the AC-1B supply to down relay coil L-18. The deenergization of L-18 releases K-25, actuating the baler motor switch (not shown) and stopping the motion of the baler head. (If there were no staple in the baler, the down limit relay would be opened when excessive travel of the baler head opened down limit switch S-9, interrupting AC-1A supply to L-18 through K-27.)

Operation of the baler overload relay causes contactor K-29 to bridge contacts K-29C and K-29D, furnishing AC-1B directly to coils L-20 and L-21; AC-1A is present on the opposite sides of these coils through the closed up limit switch. Contactor K-26 closes, furnishing current to the reset pulse circuit shown in Figure 4. (In the simplified diagram of Fig. 4, closing of K-4 would have this same result.) The path between points — and + is made up of the contactor, resistor R-9, resistor R-10 and capacitor C-1 in parallel, and coil L-5. The initial surge of current to charge C-1 energizes L-5 sufficiently to close contactor K-5, connecting L-6 between R-9 and the positive potential. The flow of current through L-6 sets up a magnetic field that throws the contactor arm of S-2 from terminal 46 to terminal 41, thus resetting the apparatus for another series of measurements. (Resetting may be accomplished at any time by manipulation of test reset switch S-3.) Since C-1 quickly becomes charged, and R-10 is a large resistance, very little current would flow between R-9 and + even in the absence of a low resistance path through L-8. This diminution in current through L-5 releases contactor K-5, halting the flow through reset coil L-8. Switch S-2 is now free to advance to its next position upon completion of the first individual measurement.

The cycle of operation of the auxiliary controls (Figure 8) continues. The flow of current through L-21 causes contactor K-27 to leave contacts K-27A and K-27B, removing AC-1A from coil L-18 (AC-1B already has been removed from the opposite side of L-18), and to join contacts K-27C and K-27D, furnishing a direct path for AC-1B to coils L-20, L-21, and L-22. With this action of K-27, the AC-1B path through K-29 to these coils is no longer required. Resetting of S-2 closes the circuit to baler lockout coil L-19 by actuating switch S-4. Current through L-19 causes K-24 to open, removing AC-1B from the series of control buttons; the position of the baler head cannot be changed from this moment until the measurement cycle is complete, whereupon S-4 will again break the circuit to L-19.

After K-24 is released upon completion of a series of five individual measurements, closing the circuit to the control buttons, the baler head may be retracted by pressing up button K-18 or K-19. Depression of an up button furnishes AC-1B to coil L-22 through closed interlocks S-6, stop button K-23, and either K-19 or both K-22 and K-18; (depending upon which up button is pressed). AC-1A is already present at the opposite side of coil L-22 through closed up limit switch S-10. Current flow through L-22 results in the closing of contactor K-28, furnishing AC-1B to L-22 through released K-29, instead of through the up button, which may be released. The movement of K-28 also actuated a baler motor up switch (not shown), so the baler head moves upward until it opens limit switch S-10, interrupting the AC-1A supply to L-20, L-21, and L-22. Cessation of current flow through L-20 releases K-26, removing the potential from the pulse circuit in the sampling unit (Figure 4). Coil L-21 is de-energized, releasing K-27 to connect AC-1A to down relay coil L-18 in preparation for another control cycle. More staple may then be placed in the baler, and depression of a down button will then lead to compression of the staple and the taking of another set of moisture measurements.

The auxiliary controls just described are rather complicated because of the necessity for safe and convenient operation of so massive a device as a baler. The light frame that carries the moisture measuring electrodes into contact with yarn or filaments upon a beam may be operated more simply by the two relays shown in Figure 4, in conjunction with valves and associated parts (not shown) for controlling the flow of compressed air to move the electrode frame up and down. If a printing device is used with either modification of this instrument, a tag or ticket in proper place to receive the printing impression, holds open switch S-11 (Figure 4), which if closed would prevent the sampling unit from resetting. This ensures that a record is made of each series of measurements taken. Also, removal of the tag (closing S-11) prevents the instrument from going through its measuring routine when the electrodes are contacting only the bale cover. If no printer is used, S-11 may be eliminated.

Resistor R-4 (Figure 5) in series with the unknown resistance existing across the electrode gap increases the measuring range of the bridge somewhat. The range employed in the usual embodiment of the invention is from 7% to 17½% moisture. Consequently, the units dial of the indicator reads 7% at the beginning of each measurement, and no electrical impulses are transmitted through the impulse wheel to the indicator until 7% moisture is exceeded by the sample being tested. For example, beginning with the first electrode unit connected to the balancing unit, if the moisture existing in the material in contact with the electrodes is 10½%, the impulse wheel sends seven electrical pulses to the computer before the balancing relays open to interrupt the intervening circuit. This represents an addition of seven-tenths percent average moisture, which is equivalent to an addition of five times seven-tenths or three and one-half per cent moisture over and above the measuring base for the individual measurement. Thus, if all five of the readings are ten and one-half percent, the computer will receive five times seven or thirty-five impulses, whereupon the reported average moisture figure will coincide with each individual moisture reading.

Usually the individual moisture measurements differ somewhat from each other, and the addition of one-fifth of the individual moisture increment each time results in a uniformly weighted arithmetic mean moisture at the conclusion of the series of measurements. The correct mean would not be obtained if the values of resistance R-1 at bridge balance for the individual electrode units were averaged together and this average resistance value were then converted to percent moisture. This is because the relationship between the resistance and moisture content is exponential rather than linear, i. e., the relationship may be expressed by a formula of the following type (for the above range):

$$R = ke^{-aM}$$

where R represents the resistance, M represents the percent moisture and $k$, $e$ and $a$ are constants. Hence means must be provided which will solve the above equation for values of M before the average is taken.

Various means can be used for transforming the resistance measurements into moisture values, such as a mechanical system involving the use of cams. Of course, if completely automatic operation is not desired, the apparatus can be arranged to indicate merely the separate, individual resistance measurements, leaving the conversion to moisture values and averaging for the operator. The impulse wheel 30, described briefly in connection with the wiring diagram of Fig. 5, together with the electro-mechanical counter described with reference to Fig. 6, is an efficient means for accomplishing the above result automatically.

Details of the impulse wheel are shown in Fig. 9. The wheel 30 of conductive material is mounted on shaft 5, the same shaft on which the potentiometer arm of the variable bridge resistance R-1 is mounted. Arranged around the periphery of the wheel are a number of contact cogs 40. The spacing of these cogs is approximately logarithmic, and is determined empirically to correspond to predetermined equal increments of moisture in the sample being measured which will provide the desired precision of measurement. For the embodiment of the invention described, the increments selected are ½ percent of moisture. The shaft S is rotated in a clockwise direction by the previously mentioned motor M-1. The cogs 40 successively contact arm 29 to complete a circuit through the wheel to wiper arm 21

At the low end of the measurement range a small change in resistance R-1 corresponds to a moisture increase of ½ percent. Consequently the cogs are quite closely spaced. In the upper measurement range a relatively large change in resistance R-1 corresponds to the above increase in moisture and the cogs are widely spaced. It is desirable to increase the speed of rotation in this upper range beyond what would be permissible in the low range in order to conserve measurement time. A pin 32 on the wheel is arranged to operate a switch S-1, which varies the speed of motor M-1 as previously described. The pin 32 is shown in the act of depressing the switch arm to slow the motor preparatory to starting a measurement. After the pin has travelled about one-sixth of a revolution it disengages the switch arm and motor M-1 speeds up for the remainder of the measurement range.

Pin 32 also operates switch S-5 of the sampling unit (Fig. 4) which selects a different electrode unit for the succeeding measurement. After the last of the cogs 40 has made contact with arm 29, the pin depresses the switch arm of S-5 and a different electrode unit is connected. As shown in Fig. 9, the pin has just completed contact with the switch arm and will not actuate S-5 again until the revolution is completed.

Other details of the construction of the impulse wheel are readily apparent from the drawing and will not be described. Various modifications for accomplishing the same purpose will also be apparent to a mechanic in the art.

The action of the entire instrument may be summarized briefly as follows: the resistance of yarn or staple fiber forms one arm of a high resistance bridge having a continuously varying resistance arm driven by a motor that also turns a wheel upon which contacts are arranged to correspond with the size of the varying resistor as an indication of the moisture content of the subject material. As it rotates, this wheel transmits counting pulses, actuating an indicator while the varying resistance is too small to balance the unknown resistance. At balance, this indicating mechanism is disengaged, and upon completion of one revolution of the impulse wheel and variable resistor another set of electrodes is connected to the bridge in place of the first. The measuring process is repeated for each set of electrodes, and when the resistance across all of them has been measured an indicator shows the average moisture. The only requirements made upon the operator are that he initiate contact of the instrument with the subject material and either record (or remove from the instrument a recording of) the measurement result. Moisture measurement by means of this invention is accurate, rapid, and exceedingly simple for the operator; the instrument itself requires little maintenance.

Since many different embodiments of the invention may be made without departing from the spirit and scope thereof, it is to be understood that the invention is not limited by the specific illustrations except to the extent defined in the following claims.

What is claimed is:

1. Apparatus for determining the moisture content of material by measuring the electrical resistance of the material at a plurality of locations which comprises a plurality of electrodes arranged to be applied in sets to different portions of the material undergoing measurement so that the electrodes in each set are spaced a predetermined distance apart to include the resistances of different samples of the material, a bridge circuit including in one arm thereof a pair of electrodes and the included resistance of a sample, a sampling unit for successively connecting each pair of electrodes into said bridge circuit in turn, adjustable resistor means located in said bridge circuit for comparison of various resistances with the resistance of one of said samples until a bridge balance is obtained, driver means for adjusting said resistor throughout its range, electrical impulse means actuated by adjustment of said resistor for transmitting pulses at predetermined intervals of said adjustment, counter means for totalling said pulses, indicator means actuated by said counter to indicate measured moisture values, bridge-operated relay means for interrupting transmission of pulses to said counter means from the moment of bridge balance until after a different pair of electrodes has been connected into the bridge circuit and said resistor has been returned to its initial position.

2. Apparatus for determining the moisture content of material by measuring the electrical resistance of the material at a plurality of locations which comprises a plurality of electrodes arranged to be applied in sets to different portions of the material undergoing measurement so that the electrodes in each set are spaced a predetermined distance apart to include the resistances of different samples of the material, a bridge circuit including in one arm thereof a pair of electrodes and the included resistance of a sample, a sampling unit for successively connecting each pair of electrodes into said bridge circuit in turn, adjustable resistor means located in said bridge circuit for comparison of various resistances with the resistance of one of said samples until a bridge balance is obtained, a wiper arm mounted on a rotatable shaft for adjusting said resistor, driver means for rotating said wiper arm shaft from an initial position through successive positions corresponding to decreasing amounts of sample resistance at bridge balance and then back to the initial position, electrical impulse means actuated by rotation of said wiper arm shaft for transmitting pulses at predetermined intervals during said rotation, counter-indicator means responsive to said pulses to indicate increasing moisture values corresponding to said decreasing amounts of sample resistance, bridge-operated relay means for interrupting transmission of pulses to said counter-indicator means from the moment of bridge balance until after a different pair of electrodes has been connected into the bridge and said wiper arm shaft has rotated back to its initial position.

3. Apparatus as defined in claim 2 in which each of said electrode sets comprises several concentric circular conductors arranged to contact one surface of the material, and alternate conductors are connected in parallel.

4. Apparatus as defined in claim 2 in which said sampling unit comprises a magnetically operated switch controlled by rotation of said wiper arm to switch automatically to the next electrode-sample circuit.

5. Apparatus as defined in claim 2 in which said electrical impulse means comprises an impulse wheel arranged to revolve with said wiper arm, a series of contact cogs spaced around the periphery of said wheel at intervals corresponding to equal increments of moisture in said sample, and a contactor arm arranged to contact each cog in turn to momentarily complete a pulse transmitting circuit as said wheel revolves.

6. Apparatus as defined in claim 2 in which said counter-indicator includes printing means for printing results of moisture determinations on tickets and the like.

JOHN ROBERT SPALDING.

REFERENCES CITED

The following references are of record in the file of this patent:

UNITED STATES PATENTS

| Number | Name | Date |
|---|---|---|
| 1,951,435 | Ovaal | Mar. 20, 1934 |
| 2,089,308 | Sullivan | Aug. 10, 1937 |
| 2,270,732 | Jones | Jan. 20, 1942 |
| 2,508,045 | Seney | May 16, 1950 |
| 2,532,929 | McBrayer | Dec. 5, 1950 |